June 2, 1931.  A. RINNE  1,807,706
ACCELERATION CONTROL
Filed Nov. 14, 1929    3 Sheets-Sheet 1

Inventor
Allan Rinne

By Clarence A O'Brien
Attorney

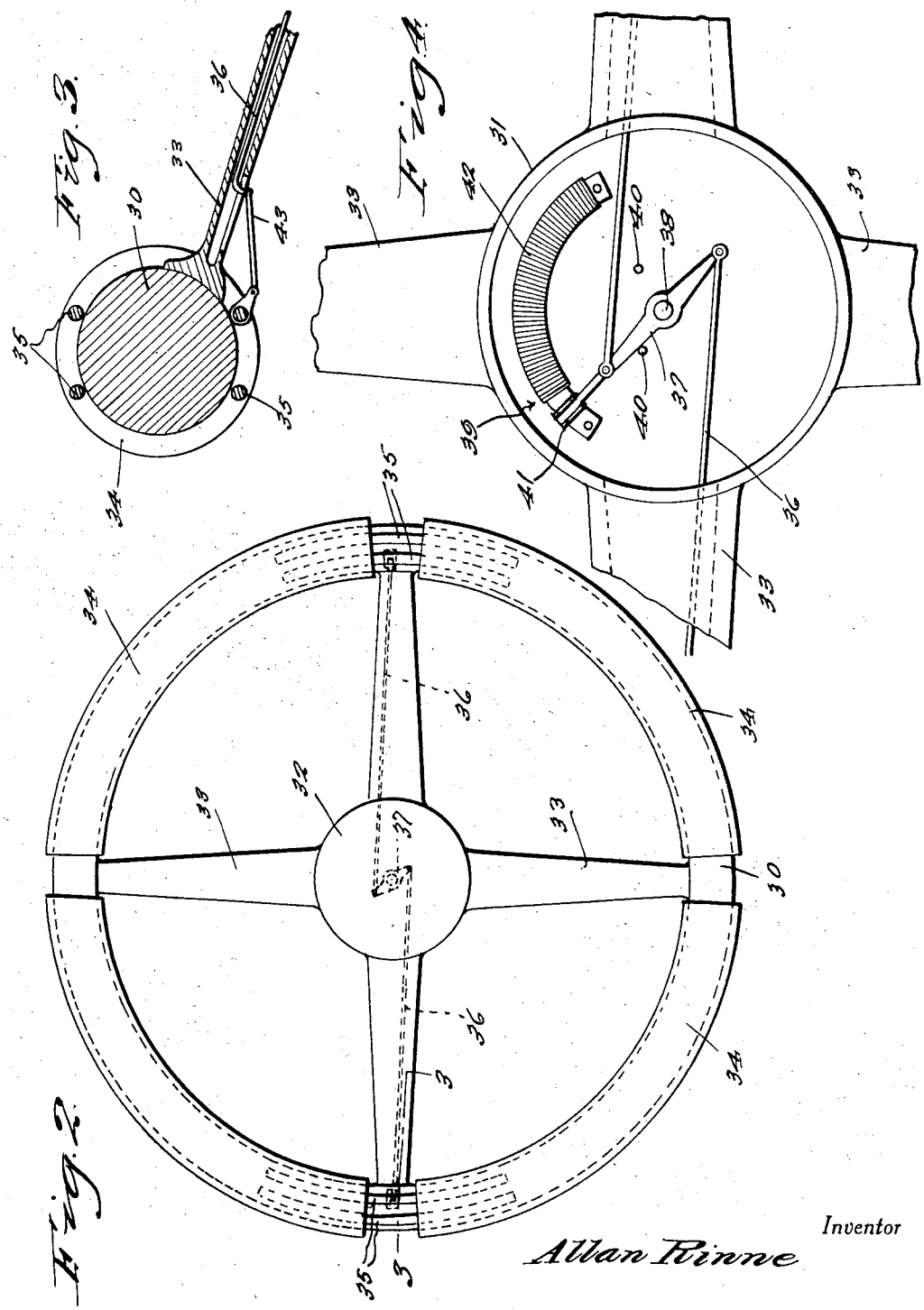

June 2, 1931.  A. RINNE  1,807,706
ACCELERATION CONTROL
Filed Nov. 14, 1929  3 Sheets-Sheet 3
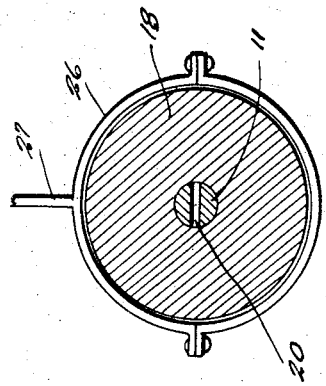
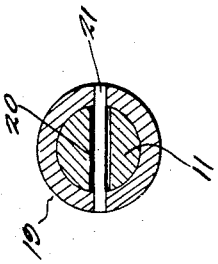
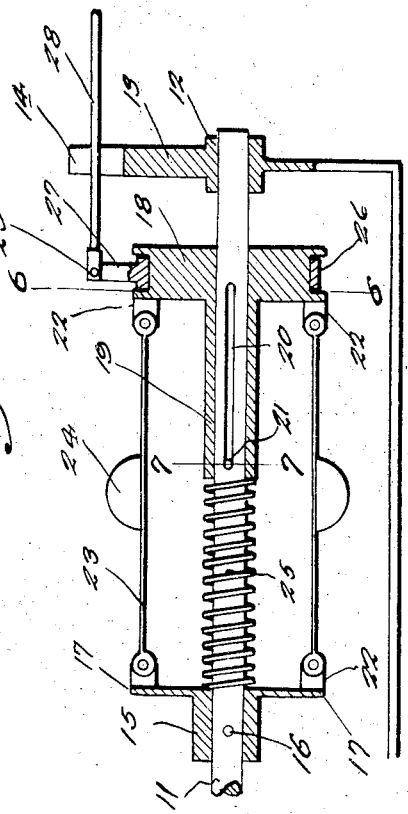
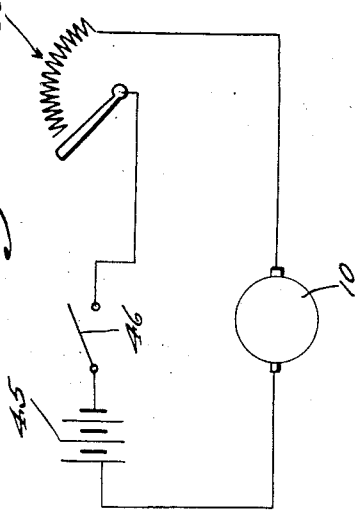
Inventor
Allan Rinne
By Clarence A. O'Brien
Attorney Patented June 2, 1931

1,807,706

UNITED STATES PATENT OFFICE

ALLAN RINNE, OF ORR, MINNESOTA

ACCELERATION CONTROL

Application filed November 14, 1929. Serial No. 407,147.

This invention appertains to new and useful improvements in accelerators for internal combustion engines and more particularly to a novel acceleration control for automobiles.

The principal object of this invention is to provide a combination electrical and mechanical accelerator for automobiles which will eliminate the usual foot control and permit the driver of the vehicle to always retain his hands on the steering wheel, yet control the acceleration by means within the grasp of the hand.

During the following description, various important objects and advantages of the invention will readily become apparent.

In the drawings:

Figure 2 represents a top plan view of the novel steering wheel structure.

Figure 3 represents a cross sectional view of a portion of the steering wheel.

Figure 4 represents a fragmentary top plan view of the steering wheel showing the cap removed from the hub to disclose the rheostat.

Figure 5 represents a longitudinal sectional view through the governor control.

Figure 6 represents a cross sectional view taken substantially on line 6—6 of Figure 5.

Figure 7 represents a cross sectional view taken substantially on line 7—7 of Figure 5.

Figure 8 represents a diagrammatic view disclosing the electrical instruments and their electrical connections.

Figure 1:
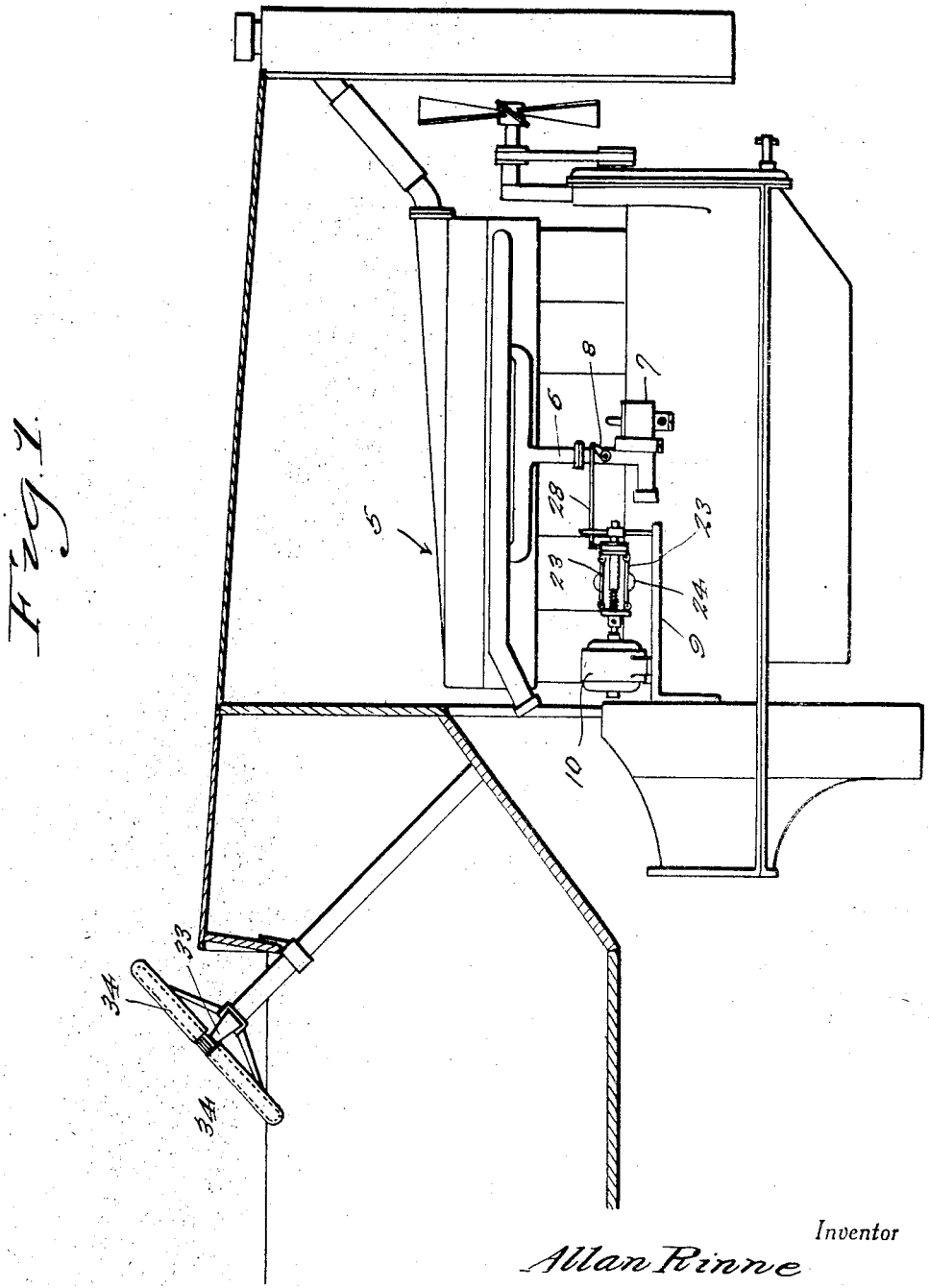
Figure 1 represents a fragmentary vertical sectional view through the forward portion of an automobile disclosing the novel mechanism attached to the engine.

Referring to the drawings wherein like numerals designate like parts, in Figure 1, an internal combustion engine is generally referred to by numeral 5 and the intake pipe is referred to by numeral 6. The usual carbureter is designated by numeral 7 and between this carbureter and the intake manifold is situated a valve which is operable by the bellcrank 8.

In carrying out the present invention, a bracket 9 is mounted adjacent the engine and upon this bracket is secured the small electric motor 10. This motor 10 drives a shaft 11 which has one end journalled within the bearing 12 of a riser 13, the upper end of which is bifurcated as at 14.

A collar 15 is secured to the shaft 11 by the pin 16 and has a pair of arms 17 projecting therefrom. A circular body 18 is provided with a sleeve 19 and as clearly shown in Figure 5, the shaft 11 projects through the said sleeve 19 and circular body 18. An elongated slot 20 is provided longitudinally in the shaft 11 and a pin 21 passes through the sleeve 19 and slot 20 to prevent rotation of the body 18 on the shaft.

The arm 17 and the body 18 are provided with corresponding pairs of ears 22 and pivotally interposed between the ears of the fingers 17 and body 18 are the spring straps 23, each carrying a weight 24. A compressible spring 25 is interposed between the collar 15 and the free end of the sleeve 19 for normally maintaining the collar 15 and body 18 spaced apart to the extent shown.

The body 18 is provided with a circumferentially extending channel within which a band 26 is loosely engaged. A lug 27 projects outwardly from this band and has one end of the rod 28 pivotally secured thereto as at 29. This rod connects at its opposite end to the aforementioned bell crank 8 of the intake valve.

As is clearly shown in Figure 2, the annular steering wheel is denoted by numerals 30. The hollow hub 31 is provided with a cap 32 and a plurality of spokes 33 radiate from the hub and connect to the wheel 30 in the usual manner.

Between the spokes 33 on the wheel 30 are arranged the tubular sections 34. These sections are free to rotate or oscillate to some extent on the rim of the wheel 30 and are connected end to end by the bars 35. Certain of the spokes 34 are hollow and through these hollow spokes are disposed the rod 36. By way of example, there are two of these rods and at their inner ends connect to the rocker arm 37 and opposite sides of its fulcrum 38.

This rocker arm 37 forms part of the rheostat generally referred to by numeral 39 and stop members 40 serve to limit the movement of said rocker arm. One end of the rocker arm is equipped with a contact structure 41 for wiping engagement with the resistance element 42, which is secured to the hub structure 31 in the manner clearly shown in Figure 4. The outer ends of the rod 36 are connected to certain of the bars 35 by links 43 and it can now be seen that by swinging the sections 34 in a given direction, the rheostat will be operated.

As is shown in Figure 8, the motor 10 is in circuit with the battery 45 and a switch 46 is also located in this battery circuit in conjunction with the rheostat 39.

It can thus be seen that when the switch 46 is closed and the sections 34 are manipulated, resistance will be cut out of the circuit so that the motor 10 will operate more rapidly. This rapid operation of the motor will contract the governor, which in turn, pulling the rod 28 will open the valve in the intake by actuating the bellcrank 8.

While the foregoing specification sets forth the elements of the invention in detail, it is to be understood that various changes in the shape, size and materials may be resorted to without departing from the spirit and scope of the invention as claimed hereinafter.

Having described the invention, what is claimed as new is:

1. In combination a steering wheel, a fuel inlet valve, an electric motor, a governor responsive to the speed of the electric motor, a connection between the governor and the valve, an electric circuit for an electric motor, a rheostat in said circuit and incorporated with the steering wheel, and means on the rim of the steering wheel for operating said rheostat.

2. In combination, a steering wheel, a fuel inlet valve, an electric motor, a governor responsive to the speed of the motor, a connection between the governor and the inlet valve, an electric circuit for the motor, a rheostat in said circuit mounted on the steering wheel, means on the steering wheel for controlling the rheostat including grip members arranged on the rim of the wheel.

3. In combination, a steering wheel, a fuel inlet valve, a motor, a governor responsive to the speed of the motor, a connection between the governor and the valve, an electric circuit for the motor, a rheostat in said circuit mounted on the steering wheel, and means on the steering wheel for controlling the rheostat including grip members having a pair of sleeves arranged loosely on the rim of the steering wheel and a connection between each of the sleeves and the rheostat.

4. In combination with the steering wheel of a motor vehicle including a hollow hub, a rim, and hollow spokes connecting the rim with the hub, an arcuate rheostat coil mounted in the hollow hub, a double ended lever rockably mounted intermediate its ends in said hub, a contact finger on one end of said double lever for movement over the rheostat coil, grip members slidable on the rim of the steering wheel, operating rods extending through the hollow spokes and connected to the double ended operating lever on opposite sides of the pivot point thereof and means connecting the hand grip with said operating rod.

In testimony whereof I affix my signature.

ALLAN RINNE.